(12) United States Patent
Tyrén

(10) Patent No.: US 6,232,879 B1
(45) Date of Patent: May 15, 2001

(54) SENSOR AND METHOD FOR REMOTE DETECTION OF OBJECTS

(75) Inventor: Carl Tyrén, Monaco (SE)

(73) Assignee: RSO Corporation N.V., Curacao (NL)

( * ) Notice: Subject to any disclaimer, the term of this patent is extended or adjusted under 35 U.S.C. 154(b) by 0 days.

(21) Appl. No.: 09/367,554

(22) PCT Filed: Feb. 13, 1998

(86) PCT No.: PCT/SE98/00251
  § 371 Date: Nov. 4, 1999
  § 102(e) Date: Nov. 4, 1999

(87) PCT Pub. No.: WO98/36393
  PCT Pub. Date: Aug. 20, 1998

(30) Foreign Application Priority Data

Feb. 17, 1997 (SE) ................................... 9700541

(51) Int. Cl.$^7$ ................................................ G08B 13/14
(52) U.S. Cl. ........................... 340/572.6; 340/572.1; 340/572.2; 340/568.1
(58) Field of Search ........................ 340/551, 572.1, 340/572.2, 572.6, 571, 572.3, 568.1, 568.6, 568.7, 572.7; 365/135, 136; 148/121, 122, 108; 235/380, 491

(56) References Cited

U.S. PATENT DOCUMENTS

| | | | |
|---|---|---|---|
| 3,765,007 | * 10/1973 | Elder | 340/572.3 |
| 5,003,291 | * 3/1991 | Strom-Olsen et al. | 340/551 |
| 5,395,460 | * 3/1995 | Martis | 148/121 |
| 5,406,262 | 4/1995 | Herman et al. | 340/572.2 |
| 5,414,412 | 5/1995 | Lian | 340/572.6 |
| 5,557,085 | * 9/1996 | Tyren et al. | 235/380 |
| 5,870,328 | * 2/1999 | Mohri | 365/135 |
| 6,137,411 | * 10/2000 | Tyren | 340/572.1 |

FOREIGN PATENT DOCUMENTS

WO 97/29463   8/1997   (WO) ................ 340/572.1

OTHER PUBLICATIONS

Mechanism of Matteicci Effect Using Armorphous Magnetic Wires, IEEE, Japan, vol. 8, No. 5, May 1993.*
Mechanism of Matteicci Effect Using Armorphous Magnetic Wires, IEEE, Japan, vol. 8, No. 5, May 1993.*

* cited by examiner

Primary Examiner—Van T. Trieu
(74) Attorney, Agent, or Firm—Finnegan, Henderson, Farabow, Garrett & Dunner, L.L.P.

(57) ABSTRACT

A sensor for remote detection of objects (20), preferably for use in an article surveillance system, comprises a wire-shaped element (22), which is arranged to be excited and detected electromagnetically. The wireshaped element (22) has a diameter less than 30 $\mu$m. The element is arranged to transmit an electromagnetic reply signal, the amplitude of which is modulated in response to an externally applied and time-varying magnetic field. According to a method of detecting the presence of an object (20) in a surveillance zone (10), the object is provided with at least one wireshaped element (22) of amorphous or nanocrystalline metal alloy with magnetic properties and with a diameter less than 30 $\mu$m. Electromagnetical signals are generated in the surveillance zone for exciting the wireshaped element. Furthermore, a time-varying magnetic modulating field is generated in the surveillance zone. Electromagnetic signals generated by the wireshaped element are received and analyzed with respect to a modulation in amplitude caused by the magnetic modulating field, so as to determine the presence of the element (and consequently the object) in the surveillance zone.

15 Claims, 2 Drawing Sheets

SENSOR AND METHOD FOR REMOTE DETECTION OF OBJECTS

TECHNICAL FIELD

The present invention relates to a sensor for remote detection of objects, preferably for use in an article surveillance system, comprising a wireshaped element, which is arranged to be excited and detected electromagnetically. Furthermore, the present invention relates to a method of detecting the presence of an object in a surveillance zone.

DESCRIPTION OF THE PRIOR ART

There is an increasing demand within business and industry for simple but still reliable systems for contactless surveillance of objects or articles within a given area. A common example is electronic article surveillance systems for e.g. shops, where each monitored object is provided with an article surveillance sensor and where the system is arranged to detect the presence of this sensor as well as to generate an appropriate alarm signal, when an object is about to be removed from e.g. the shop premises without permission.

For a common type of such electronic article surveillance systems each article is provided with a small label, which comprises a thin metallic strip or wire with magnetic properties. At either sides of the shop exit arc-shaped, magnetic field generating devices are located for generating a magnetic field between themselves. If an article, which has been provided with such an article surveillance label, is moved in between the arc-shaped devices, the metallic element is affected by the magnetic field, wherein a detectable physical change occurs for the element. Use is often made of the fact that an alternating magnetic field causes a periodical switch in the magnetic dipole momentum of the metallic element—known as Barkhausenjumps. Alternatively, the metallic element may, if designed appropriately, be made to oscillate mechanically. These physical changes are detected inductively in the arcs, wherein the presence of the article may be determined between the arcs.

Sensors of this kind are for instance disclosed in the U.S. patent publication U.S. Pat. No. 5,496,611, the European Patent publication EP-A-0 710 923 or the European Patent publication EP-A-0 716 393. All these sensors comprise a soft-magnetic metallic wire with a diameter of at least 60–115 μm and a length of between 5 and 10 cm. During the detection the sensor is exposed to an alternating magnetic field of low frequency, wherein said field generates the Barkhausenjumps described above in the magnetic metal wire. These Barhausenjumps, i.e. periodical switches of the magnetizing direction, are detected inductively.

U.S. Pat. No. 5,406,262 relates to an electronic article surveillance system as described above, the system furthermore being provided with a coil for generating a magnetic bias field in the surveillance zone. Sensors of the types described above require, as a matter of fact, a certain degree of magnetic bias in order to be active, i.e. detectable. By driving the coil in such a way, that the magnetic bias field sweeps, in terms of fieldstrength, within a given range, there is an improved opportunity that sensors present in different parts of the surveillance zone will be exposed to a bias field strength, which lies within the active range of the sensor and therefore prevents the sensor from escaping detection.

U.S. Pat. No. 5,003,291 relates to the use of thin ferromagnetic fibers in electronic article surveillance systems. These fibers, which may have a diameter of between 3 and 80 μm, are arranged to be excited and detected in an essentially inductive way, in similarity to the above, by means of an alternating magnetic field with a frequency within the kHz-range.

Sensors of the type described above have a disadvantage in that the detection must take place quite close to the sensor, since the detection is carried out inductively. In order to obtain sufficiently large Barkhausenjumps, the magnetic metal wire must furthermore be sufficiently thick, which in reality, for the previously known systems, often has implied a diameter of at least the order of 100 μm. Such a thick wire must be attached to a carrier, label, etc, for facilitating the mounting of the sensor on the respective article and for avoiding damages to objects or people.

Another problem with conventional article surveillance systems is the risk of false alarms caused by the fact that other magnetic objects than the sensors may become excited and detected.

SUMMARY OF THE INVENTION

It is an object of the present invention to provide a sensor for e.g. an article surveillance system, which may be detected at a longer distance than previously known sensors.

Another object is to considerably reduce the risk of false alarms according to the above.

Additionally, the present invention aims at providing a sensor of a very simple design, which may be manufactured at an extremely low cost and which also may be easily mounted to the monitored object, even at such positions, which are hidden or inaccessible to a normal customer and the shop personnel as well as to a potential thief.

The objects above are achieved by a sensor for remote detection of objects, preferably for use in an article surveillance system, comprising a wireshaped element, which is arranged to be excited and detected electromagnetically. The wireshaped element has a diameter less than 30 μm, and the element is arranged to transmit an amplitude-modulated electromagnetic reply signal in response to an externally applied and time-varying magnetic field. The objects are furthermore achieved by a method of detecting the presence of an object in a surveillance zone, the method comprising the following steps:

the object is provided with a wireshaped element of amorphous or nanocrystalline metal alloy with magnetic properties and with a diameter less than 30 μm, electromagnetic signals are generated in the surveillance zone for exciting the wireshaped element, a time-varying magnetic modulating field is generated in the surveillance zone, electromagnetic signals generated by the wireshaped element are received and the received electromagnetic signals are analyzed with respect to a modulation in amplitude caused by the magnetic modulating field for determining the presence of the element (and consequently the object) in the surveillance zone.

BRIEF DESCRIPTION OF THE DRAWINGS

Preferred embodiments of the present invention will now be described with reference to the accompanying drawings, in which.

DETAILED DISCLOSURE OF PREFERRED EMBODIMENTS

Figure 1:
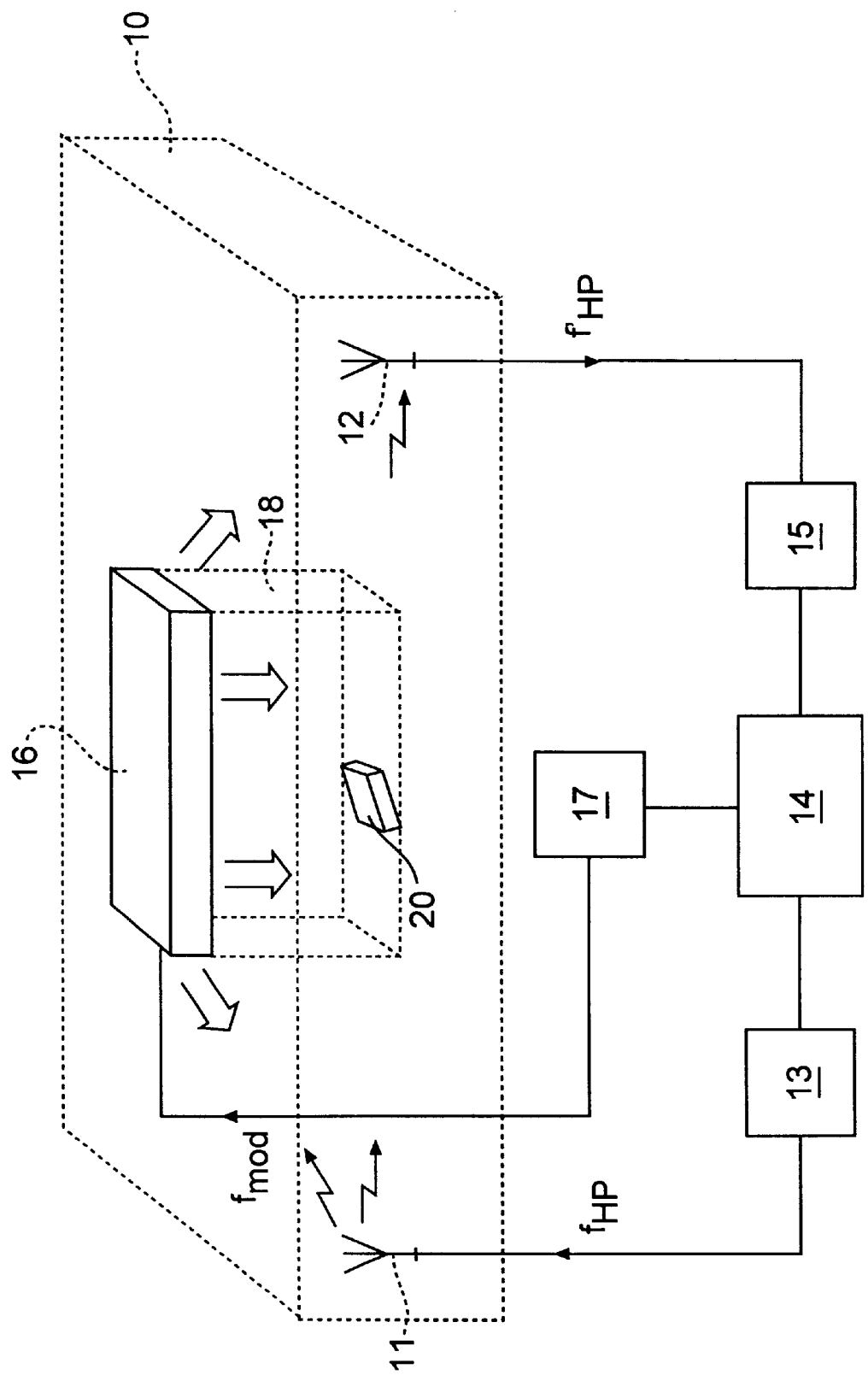
FIG. 1 is a schematic block diagram of an article surveillance system, for which the present invention is applied.

FIG. 1 illustrates an article, surveillance system, in which a sensor according to the present invention is used. A transmitter antenna 11 and a receiver antenna 12 are arranged in a surveillance zone 10. The transmitter antenna 11 is operatively connected to an output stage 13, which in turn is connected to a controller 14. The output stage comprises various commercially available driving and amplifying circuits and means for generating an electric current of high frequency, said current flowing alternatingly back and forth through the transmitter antenna 11 when supplied thereto, wherein a high-frequency electromagnetic field of frequency $f_{HF}$ is generated around the transmitter antenna. This electromagnetic field is used, as will be described in more detail below, for exciting a sensor 22 present in the surveillance zone 10 (see FIGS. 2 and 3), so that the sensor will transmit, at the reception of elecromagnetic energy from the transmitter antenna 11, an electromagnetic reply signal, which is received by the receiver antenna 12.

The receiver antenna 12 is operatively connected to an input stage 15, which comprises conventional means with amplifying and signal processing functions, such as bandpass filtering and amplifying circuits. Furthermore, the input stage 15 is connected to the controller 14 and is arranged to provide the latter with a received signal, which has been processed according to the following.

The transmitter antenna 11 as well as the receiver antenna 12 thus have the purpose of converting, in a known way, between an electrical signal of high frequency and an electromagnetic signal. Preferably, the antennas are helically formed antennas with rotating polarization (for optimal coverage in all directions), or alternatively conventional end-fed or center-fed halfwave whip antennas, but other known antenna types are equally possible.

The surveillance zone 10 is additionally provided with a means 16 for generating a magnetic field, preferably in the form of a coil arrangement. In situations where the surveillance zone 10 is an antipilferage-protected shop exit, the coil arrangement is preferably, for aesthetical reasons, arranged just below the ceiling or between ceiling and roof.

The magnetic field generating means 16 preferably comprises an electric conductor, such as copper wire, which is wound in one or more than one turns—either freely or around a coil frame. Preferably, the coil arrangement has the shape of a rectangle, which is large enough for covering the entire intended surveillance zone, which may be the entire shop exit area or chosen portions thereof, with a magnetic modulating field described below.

The coil arrangement 16 is connected to the controller 14 via a driving stage 17. The driving stage 17 comprises means for generating a modulating current $i_{mod}$, which is supplied through the coil, wherein a magnetic modulating field $H_{mod}$ is generated around the coil and propagates through essentially the entire surveillance zone 10. The modulating current is given a known variation in amplitude versus time according to $i_{mod}(t)=f(t)$. In its simplest form the modulating current follows a pure sinusoidal waveform of frequency $f_{mod}$, but also other, more complicated mathematical functions are possible. Hence, the varying modulating current generates a correspondingly varying magnetic field.

Figure 3:
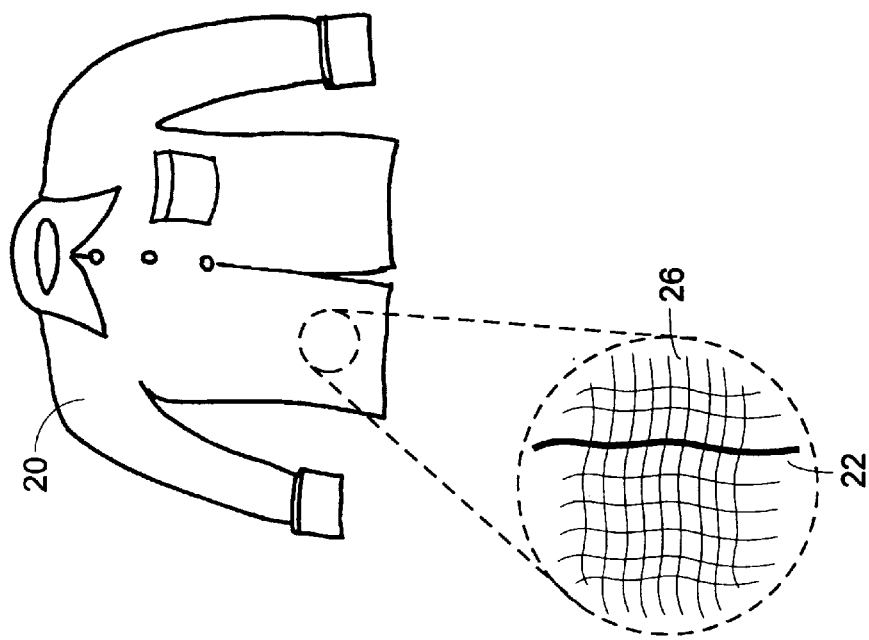
FIGS. 2 and 3 are examples of possible ways in which an article of clothing may be provided with a sensor according to the invention.
Figure 2:
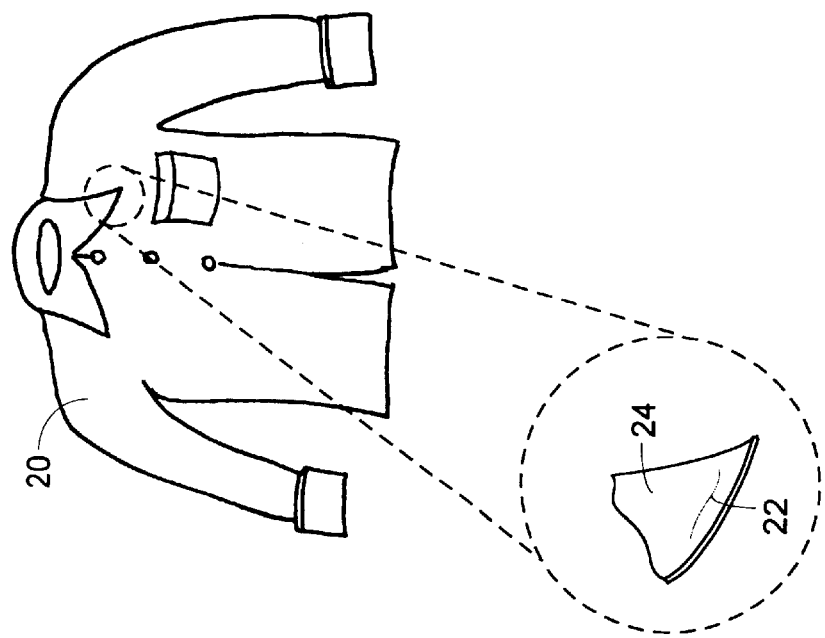

An object 20, which has been schematically illustrated in FIG. 1 in the form of a box-shaped package, is provided with a sensor 22 according to the invention. FIGS. 2 and 3 illustrate a few examples of how the sensor 22 may be applied to the monitored object (here: an article of clothing 20). The sensor 22 is comprised by a very thin wireshaped element of an amorphous or nanocrystalline metal alloy with magnetic properties. The wireshaped element 22 is of a "microwire" type and has a diameter less than 30 μm. Preferably, the amorphous or nanocrystalline metal alloy contains a high ratio of cobalt and furthermore a certain ratio of iron and other metals. The general magnetic properties of such materials are described in "RAPIDLY SOLIDIFIED ALLOYS—Engineering Magnetic Properties", by A. Hernando and M. Vázquez, Marcel Dekker Inc., 1993. They are also described in "J. Phys. D: Appl. Phys. 29 (1996) 939–949", "A soft magnetic wire for sensor applications", by M. Vázquez and A. Hernando, 1995. Also the document "IEEE TRANSACTIONS ON MAGNETICS", Vol. 30, No 2, Marc 1994. "Magnetic Bistability of Amorphous Wires and Sensor Applications", by M. Vázquez, C. Gómez-Polo, D. X. Chen and A. Hernando, relates to the subject. This also holds true for the document "IEEE TRANSACTION ON MAGNETICS", Vol. 31, No. 2, Marc 1995, "The magnetization reversal process in amorphous wires", by M. Vásquez and D. X. Chen. All these documents are fully incorporated herein by reference.

However, it is important to notice that all applications described in the documents above are directed at the detection of Barkhausenjumps, as described in previous sections. A novel aspect of the present invention is instead to use, for detecting purposes, a different physical property of amorphous and nanocrystalline metal alloys, namely that the permeability of the material depends on the magnitude of an externally applied magnetic field in the longitudinal direction of the element. Furthermore, the effect called Giant Magnetoimpedance is used in such wireshaped elements, when these are exposed to an electromagnetic field of high frequency. This effect is described, i.a., in the publication "Giant Magnetoimpedance Effect in Soft Magnetic Wires for Sensor Applications", by M Vásquez, M. Knobel, M. L. Sánchez, R. Valenzuela and A. P. Zhukov, which is available from the Instituto Magnetismo Aplicado, P. O. Box 155, 28230 Las Rozas, Spain.

The wireshaped element 22 is more or less free from magnetostriction and will therefore not convert magnetic energy to mechanical energy, wherein the risk of undesired mechanical resonance phenomena is avoided as a consequence. The wireshaped element 22 is furthermore electrically conductive, and the longitudinal extension thereof is adjusted for optimum antenna functionality, as will be described below. The amorphous or nanocrystalline metal alloy of the element has an essential feature in that the permeability thereof may be controlled by the magnetic field generated by the coil arrangement 16. The controllable permeability is used according to the invention for controlling the amplitude of the electromagnetic reply signal transmitted from the sensor 22.

When the sensor 22, which is arranged in the object 20, is exposed to the electromagnetic excitation field with frequency $f_{HF}$ from the transmitter antenna 11, the sensor element 22 will act as an antenna. An electrical current is induced in the wireshaped element, provided that its length is adjusted to the frequency $f_{HF}$—or actually the corresponding wavelength—of the high-frequency excitation signal. The induced current flows back and forth in the element 22, wherein an electromagnetic field is generated as a result around the element, said electromagnetic field being propagated through the surveillance zone 10 and eventually reaching the receiver antenna 12 as a reply signal, wherein the reply signal is received and supplied to the controller 14 as an indication of the sensor element 22 (and the object 20, to which the sensor element is attached) being present in the surveillance zone 10. Hence, the wireshaped element 22 has a double function as receiver of the electromagnetic excitation signal as well as transmitter of the electromagnetic reply signal. However, since these signals are of the same frequency, they would not have not been possible to differentiate, had the measures below not been taken.

As previously mentioned the permeability of the wireshaped element material may be controlled by the magnetic modulating field. More specifically, the amplitude of the reply signal may be controlled through the Giant Magnetoimpedance effect or Skin-Depth effect in the amorphous or nanocrystalline element material. It may be shown that the impedance Z of the wireshaped element 22 is a function of the square root of the permeability $\mu$, the frequency f and the resistivity $\rho$ of the element material, i.e. $Z \sim (\pi \cdot \mu \cdot f \cdot \rho)^{1/2}$. Due to the permeability dependence of the impedance also the amplitude of the current through the conductor is changed as a function of the permeability.

Consequently, it is readily realized that the amplitude of the current induced in the sensor element will vary in response to the variations of the magnetic modulating field in the surveillance zone, said modulating field controlling the permeability of the element, as described above. Furthermore, the electromagnetic reply signal transmitted from the element 22 is an amplitude-modulated signal, which has been modulated by the frequency of the modulating field and the carrier frequency of which is the frequency of the electromagnetic excitation signal. The presence of a modulation in amplitude of the reply signal received at the receiver antenna 12 consequently indicates the presence of the sensor element 22 in the surveillance zone 10. As a result the risk of false alarms is considerably reduced, since any reply signals originating from foreign objects in the surveillance zone (for instance pens or screwdrivers) will not show any modulation in amplitude, thanks to the fact that such foreign objects lack the unique material property described above.

According to a basic embodiment of the present invention the sensor is constituted solely by a very thin wireshaped element 22 of amorphous or nanocrystalline metal alloy with magnetic properties (a wire known as a microwire). Preferably, the element has a circular cross section and an essentially straight longitudinal extension. Additionally, the diameter of the element is less than 30 $\mu$m and is preferably as small as about 5–15 $\mu$m. As described above, the length of the wireshaped element 22 will have to be adjusted to the frequency of the electromagnetic excitation signal; however, lengths between a centimeter and a few decimeters, or even longer, have proven suitable. Trials have shown that some types of microwires have signal properties, which are fully comparable to the signal properties of a conventional and, relatively speaking, thick wire with a diameter of for instance 125 $\mu$m. Since the diameter of a microwire is at least 10 times smaller than the diameter of a conventional amorphous wire, this will reduce the cross-sectional area and the volume a 100 times. Consequently, the sensor element according to the present invention will only require about one percent of the mass required for previously known sensor elements.

Thanks to the element 22 being extremely thin (as a comparison, a normal human hair grown on the head has a thickness of 100–300 $\mu$m), the element 22 may be arranged at a virtually unlimited number of different positions on or inside the object 20 to be monitored. More specifically, the sensor element 22 may be placed at such positions, which are unavailable or hidden from the human eye. Even a sensor element, which is mounted at a surface level, is extremely difficult to recognize for the human eye, particularly if the exact position thereof is not known. Naturally, it is also possible to provide the object with several sensor elements 22, which are located at different appropriate positions in or on the object.

If the monitored object 20 is an article of clothing, such as the shirt 20 shown in FIGS. 2 and 3, the sensor element 22 may be sewn into for instance a collar tip 24, a cuff, a brand label, etc, when the shirt 20 is manufactured, as is shown in FIG. 2. The sensor element may be helically or helicoidally formed for improved stability. Alternatively, the sensor element 22 may be sewn or woven into the actual cloth, as is illustrated in the enlarged section of FIG. 3, at a portion of the cloth 26 of the shirt 20.

If the monitored object is packed in for instance cardboard, plastic film or paper wrapping, the sensor element 22 may be integrated into the packing material already at the manufacturing thereof.

According to an alternative embodiment the wireshaped element 22 may be formed as a core of amorphous or nanocrystalline metal alloy according to the above, which is coated with a sleeve of glass or another dielectric material. Such a glass coating is for instance described in "Journal of Magnetism and Magnetic Materials 8123 (1996)", "Magnetic properties of glass coated amorphous and nanocrystalline microwires", by M. Vázquez and A. P. Zhukov. The glass-coating has several advantages:

From a manufacturing pint of view the production of the amorphous wire material is made easier, if it is surrounded by glass. The glass coating has a supporting influence, which makes it possible to produce even thinner amorphous wires, than would have been possible in reality without the help of the glass coating.

The sensor element is mechanically biased by the glass coating in the form of an interaction between the glass coating and the amorphous metal core. Certain magnetic and physical properties are influenced in a positive way in terms of the sensor function, such as the helical anisotropy of the sensor element.

The dielectrical environment of the metal core (i.e. the glass coating) provides a virtually longer antenna, since the speed of propagation of electromagnetical waves is slower in a dielectrical material than in vacuum.

The glass coating isolates the sensor element electrically, which eliminates the risk of an undesired galvanic contact with other conductive materials in the monitored object. Additionally, the glass coating thermally isolates the sensor element from the environment.

According to an additional embodiment of the present invention, the sensor element may be reinforced by a second wireshaped support element of non-magnetic material. This support element is wound or wrapped together with the sensor element 22 in order to reinforce the latter. A yarn-type wire is formed, which advantageously may be woven into a piece of cloth, from which for instance the article of clothing is manufactured. Hence, the articles of clothing may already at the time of manufacture be provided with an antipilferage protection according to the invention.

The invention has been described above by way of a few embodiments. However, it is realized that the invention is applicable also to other embodiments not shown herein. Consequently, the invention is only limited by the scope of the invention, as defined by the appended independent patent claims.

What is claimed is:

1. A sensor for remote detection of objects, preferably for use in an article surveillance system, comprising:
    a wire_shaped element arranged to be excited and detected electromagnetically,
    wherein the wire_shaped element has a diameter less than 30 µm, and
    the element is arranged to transmit an electromagnetic reply signal, the amplitude of the reply signal being modulated in response to an externally applied time-varying magnetic field.

2. A sensor according to claim 1, wherein the wire_shaped element comprises an amorphous metal alloy.

3. A sensor according to claim 1, wherein the wire_shaped element comprises a nanocrystalline metal alloy.

4. A sensor according to any one of claims 2 or 3, wherein the metal alloy is cobalt-rich.

5. A sensor according to any one of claims 1–3, wherein the permeability of the metal alloy is controllable through the varying magnetic field.

6. A sensor according to any one of claims 1–3, wherein the wire_shaped element is covered with a coating of glass or other dielectrical material.

7. A sensor according to any one of claims 1–3, wherein the wire_shaped element has an essentially circular cross-section and is straight in a longitudinal direction of the element.

8. A sensor according to any one of claims 1–3, wherein the wire_shaped element extends helically or helicoidally in a longitudinal direction.

9. A sensor according to any one of claims 1–3, including a wire_shaped support element of non-magnetic material, the support element being twisted together with said wire_shaped elmenet of magnetic material.

10. A method of detecting the presence of an object in a surveillance zone, comprising the steps of:
    providing the object with at least one wire_shaped element of amorphous or nanocrystalline metal alloy with magnetic properties and with a diameter less than 30 µm,
    generating electromagnetic signals in the surveillance zone for exciting the wire_shaped element,
    generating a time-varying magnetic modulating field in the surveillance zone,
    receiving electromagnetic signals generated by the wire_shaped element, and
    analyzing the received electromagnetic signals with respect to a modulation in amplitude caused by the magnetic modulating field, so as to determine the presence of the element—and consequently the object—in the surveillance zone.

11. A method according to claim 10, wherein said object is an article of clothing and the wire_shaped element is provided in a label located in the article of clothing.

12. A method according to claim 10, wherein said object is an article of clothing and said wire_shaped element is sewn into a collar in the article of clothing.

13. A method according to claim 10, wherein said object is an article of clothing, and the wire_shaped element is woven into a cloth, from which the article of clothing is manufactured.

14. A method according to claim 10, wherein said object is packed in cardboard, paper or similar material and the wire_shaped element is integrated in the packing material at the manufacturing thereof.

15. A method according to claim 10, wherein said object is packed in a plastic film or similar material, and the wire_shaped element is integrated in the plastic film at the manufacturing thereof.

* * * * *